Jan. 29, 1952    A. RODEL ET AL    2,583,595
FOOD CUTTING APPARATUS
Filed Dec. 11, 1948      4 Sheets-Sheet 1

INVENTORS
K.E. SCHUKRAFT
A. RODEL
BY Patrick J. Roche
ATTORNEY

Jan. 29, 1952     A. RODEL ET AL     2,583,595
FOOD CUTTING APPARATUS
Filed Dec. 11, 1948     4 Sheets-Sheet 2
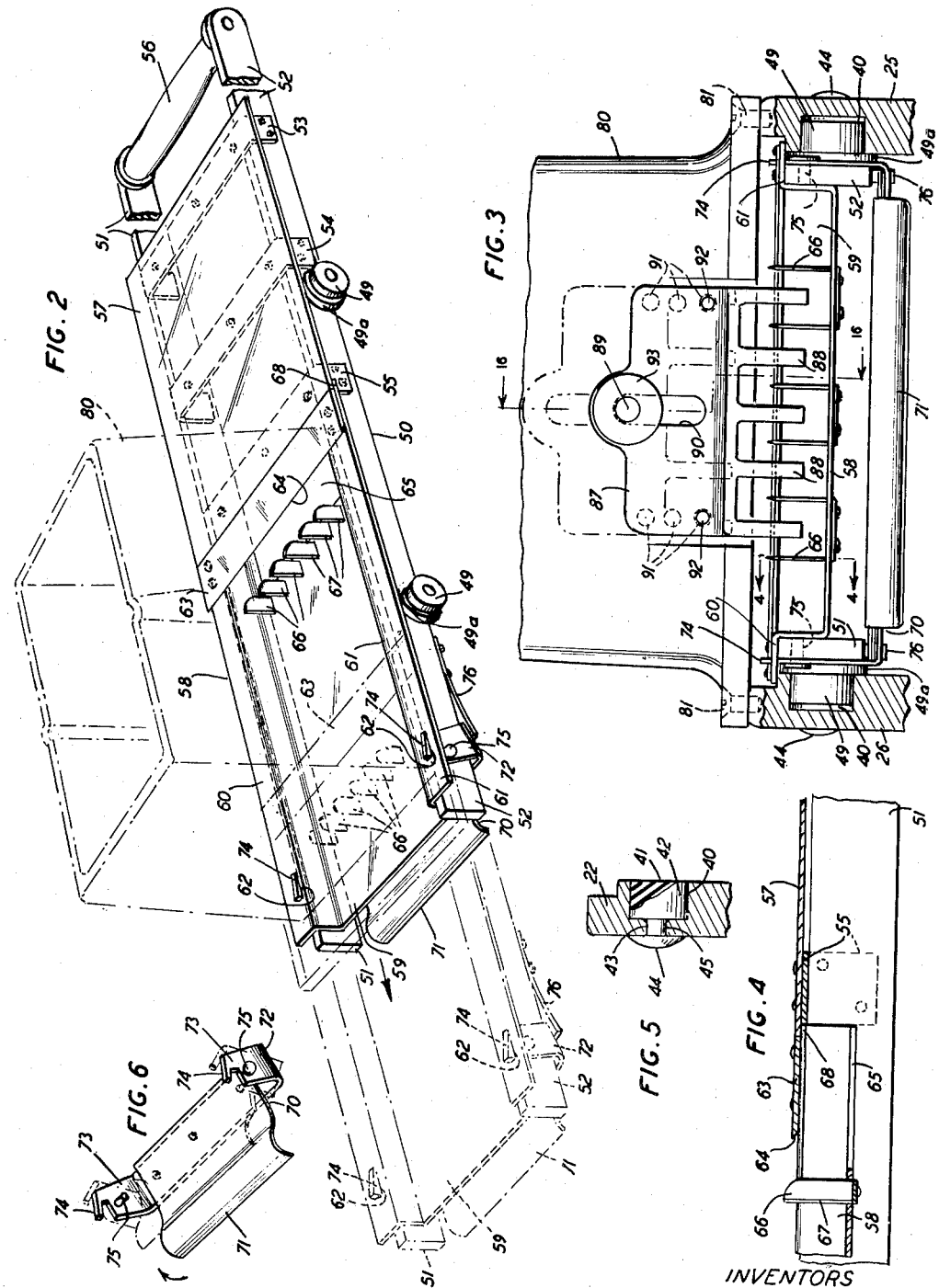
INVENTORS
K. E. SCHUKRAFT
A. RODEL
BY Patrick J. Roche
ATTORNEY

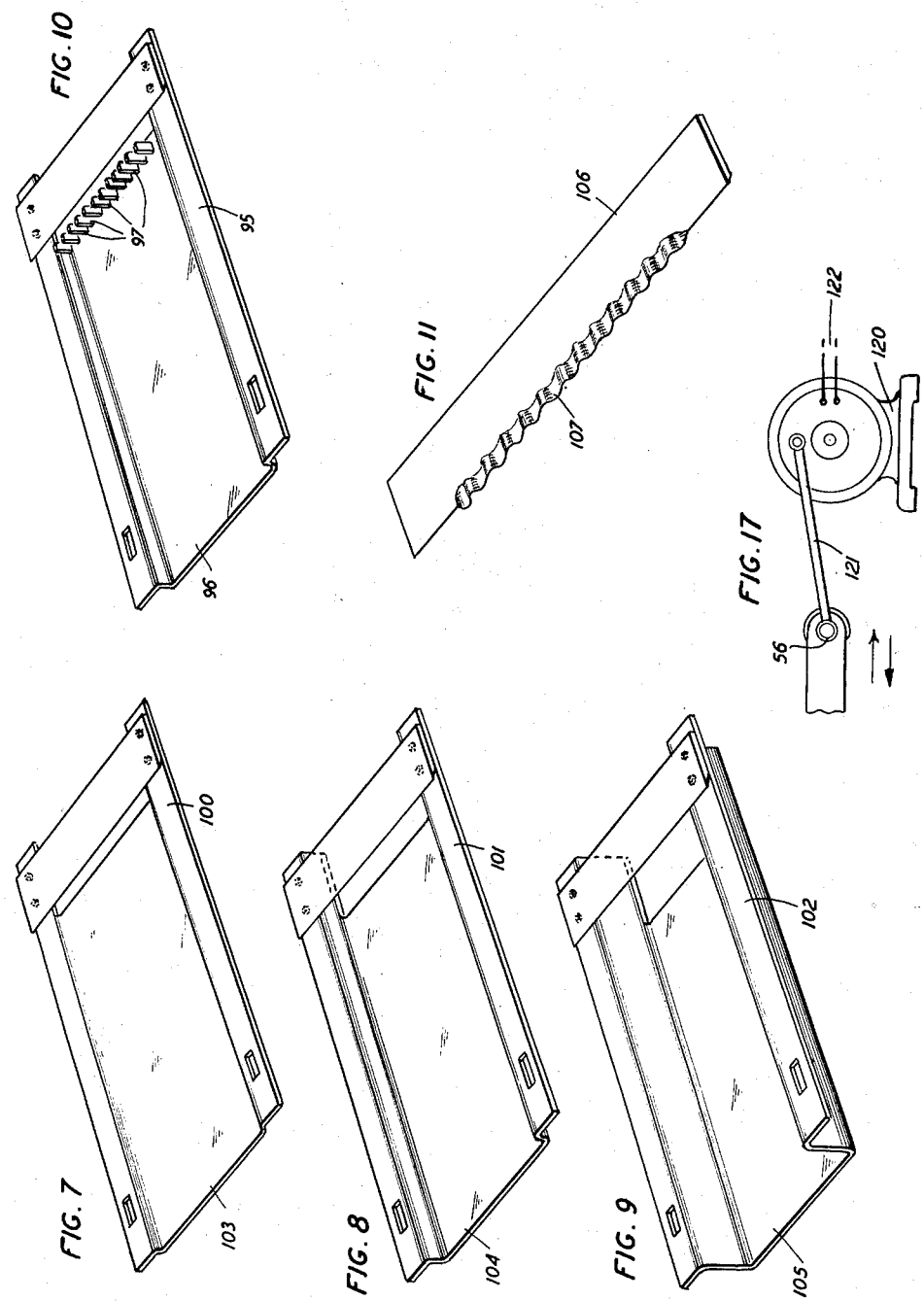

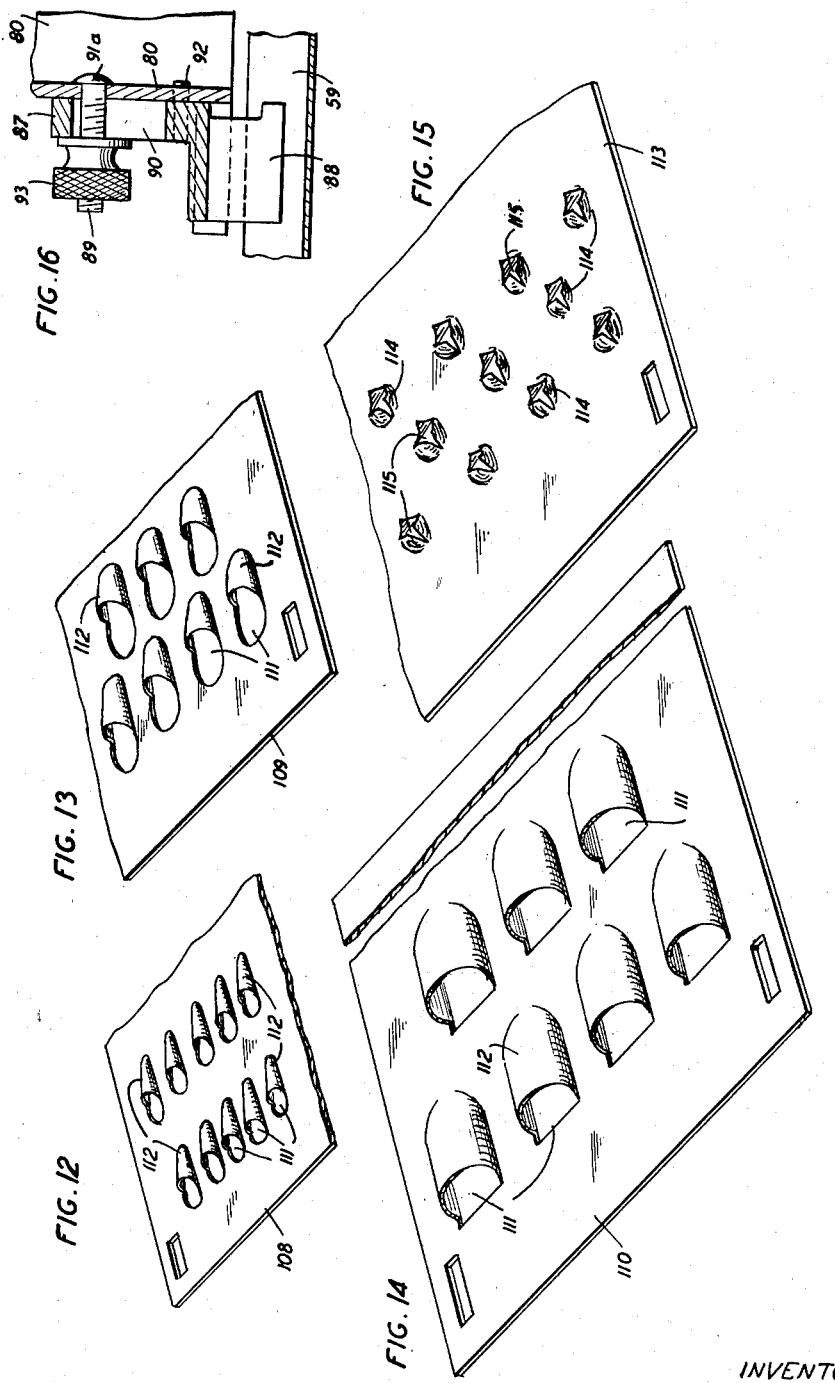

Patented Jan. 29, 1952

2,583,595

UNITED STATES PATENT OFFICE 2,583,595

FOOD CUTTING APPARATUS

Albert Rodel, New York, and Karl E. Schukraft, Brooklyn, N. Y.; said Schukraft assignor to said Rodel Application December 11, 1948, Serial No. 64,868

4 Claims. (Cl. 146—78)

This invention relates to apparatus for cutting fruit, vegetables and the like into various sizes and shapes, and more specifically to such apparatus for slicing, dicing, cubing, shredding or grating fruit, vegetables and the like into sections having smooth or wavy surfaces including the so-called "French" and "Julienne" types of potato sections.

In known food cutting apparatus, the cutting members are fixed and the food to be cut is passed thereover whereby the cutting members are uncovered during the cutting and non-cutting strokes of the food. This tends to expose a user to the danger of personal injury due to contact with the cutting members; and, at the same time, it permits foreign objects to gain access to the cutting members whereby the latter may be damaged and/or the food contaminated.

The present invention contemplates food cutting apparatus in which the cutting members are at all times entirely enclosed during the cutting and non-cutting strokes thereof.

It is a main object of the invention to cut food in predetermined shapes.

It is another object to cut food into sections of dice, cubes or slices.

It is a further object to cut potatoes into sections of the so-called "French" or "Julienne" types.

It is another object to grate food.

It is another object to shred food.

It is another object to cut food into sections having wavy surfaces on opposite sides.

It is another object to cut food into desired shapes by a hand operation.

It is another object to cut food into preselected configurations by a power operation.

In a specific embodiment of the invention, a support adapted for detachable mounting on a table top or the like comprises a pair of inverted U-shaped members spaced in a horizontal plane and formed with two grooves disposed in opposed relation in a horizontal plane. These grooves accommodate a plurality of rollers mounted in spaced relation in a horizontal plane on a cutting mechanism whereby the cutting mechanism is enabled to slide in opposite horizontal directions in the support. The cutting mechanism carries a detachable cutting element comprising a trough formed with an opening at one end thereof, a knife affixed transversely of the trough in a horizontal plane above the opening, and a plurality of knife blades positioned vertically in spaced relation transversely of the trough in proximity of one edge of the opening. The knife blades slit the food in a plurality of parallel vertical planes while the knife cuts the slitted portion in a horizontal plane just below the uppermost ends of the slitted portions. The trough, the knife blades and the knife are so mutually proportioned and positioned that a portion of the food is cut from the main body thereof into a predetermined shape during a slidable movement of the cutting mechanism. A hopper positioned on the U-shape members above the cutting mechanism for containing the food to be cut includes a hollow interior so proportioned as to enclose entirely the knife blades and the knife during the complete slidable movements of the cutting mechanism. The cut food portions pass through the opening in the cutting element and into a suitable receptacle positioned below the hopper.

A feature of the invention concerns the enclosing of the cutting knife and the knife blades so as to preclude the user and/or external substances from coming in contact therewith thereby avoiding harm to the user and contamination of the food. A feature relates to arrangements for detachably mounting the entire cutting apparatus on a table top or the like. Another feature involves various types of cutting elements whereby the cut food portions are provided with predetermined shapes suitable for different cooking styles. These contemplate such different shapes as so-called "French" and "Julienne" types, cubes, slices and dice as well as shredding and/or grating. Another feature concerns a cutting element having a knife with a wavy cutting edge for providing wavy surfaces on at least two opposite surfaces of the cut food portions. Another feature relates to an off-center device for locking the cutting elements in the cutting mechanism in such manner that the slidable movements of the cutting mechanism in one direction tend to further lock the cutting elements therein. Another feature involves a food stop adjustably mounted on a face of the hopper for pushing through the trough opening and into the container cut food portions whose vertical depths are substantially equal to or less than the vertical distance between the bottom of the trough in the cutting element and the under surface of the cutting knife. This tends to preclude waste of food sections of such size. A further feature concerns a resilient bumper for limiting the horizontal movements of the cutting mechanism in the support mounted on the table top or the like.

The invention will be readily understood from the following description when taken together with the accompanying drawing in which:

Fig. 2 is a perspective view of a partial assembly of the cutting mechanism included in the embodiment of Fig. 1;

Fig. 3 is a partial front elevational view taken along line 3—3 in Fig. 1;

Fig. 4 is an elevational view taken along line 4—4 in Fig. 3;

Fig. 5 is an elevational view taken along the line 5—5 in Fig. 1;

Fig. 6 is a partial perspective view of a device for locking a cutting element in the cutting mechanism of Fig. 2;

Figs. 7 through 10 are perspective views illustrating various types of cutting elements contemplated for use in the cutting mechanism of Fig. 2;

Fig. 11 is a perspective view of a cutting knife that may be utilized in the cutting elements of Figs. 2 and 7 through 10;

Figs. 12, 13 and 14 are partial perspective views of various types of shredding elements that may be employed in cutting mechanism of Fig. 2;

Fig. 15 is a partial perspective view of a grating element that may be included in the cutting mechanism of Fig. 2;

Fig. 16 is a cross sectional view taken along the line 16—16 in Fig. 3; and

Fig. 17 is a partial elevational view showing the cutting mechanism of Figs. 1 and 2 adapted for electrical power operation.

Figure 1:
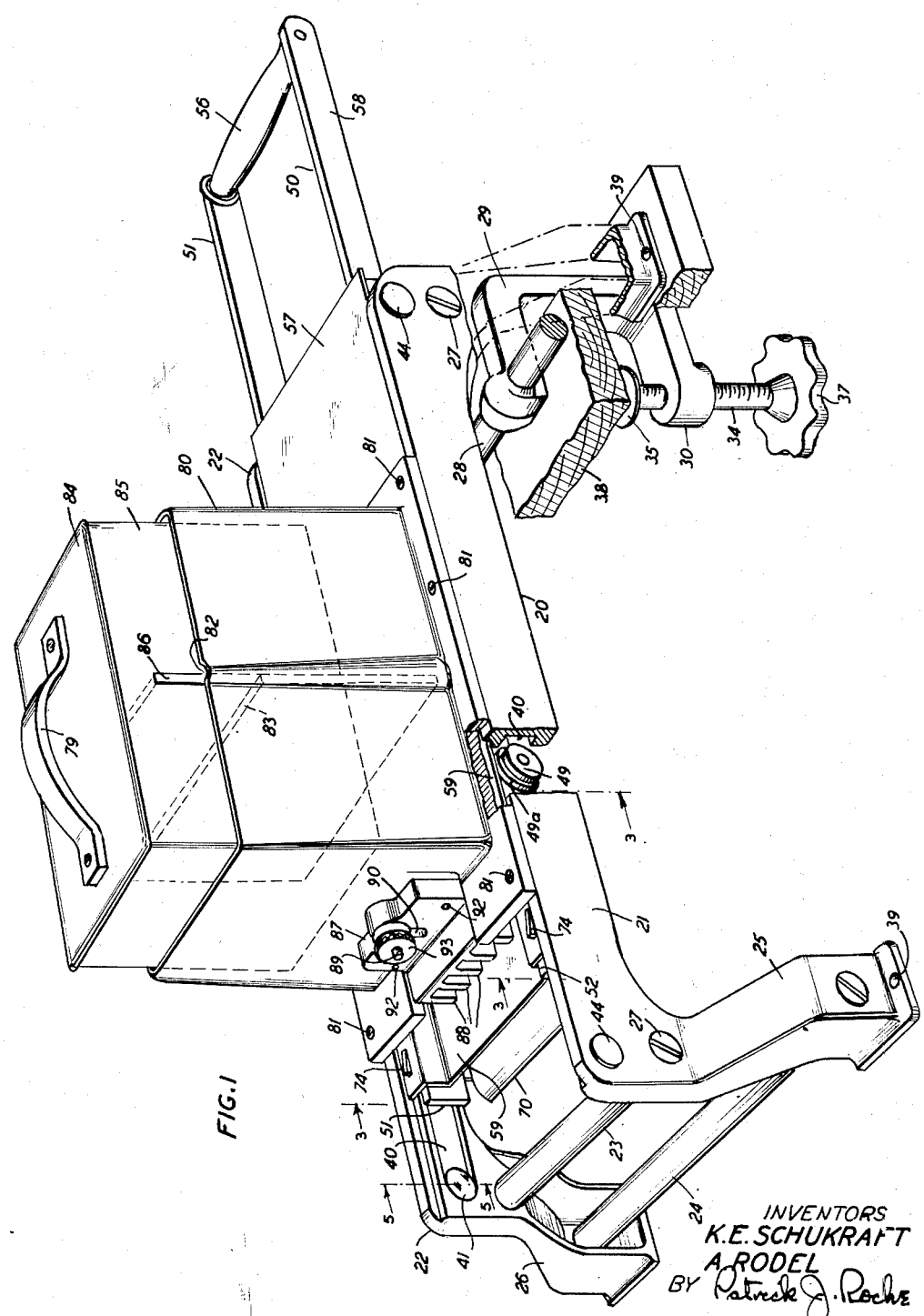
Fig. 1 is a perspective view showing a complete assembly of the apparatus according to a specific embodiment of the invention.

Referring to Fig. 1 a support 20 comprises a pair of inverted U-shaped members 21 and 22 held in spaced relation in a horizontal plane by a pair of separated spacers 23 and 24 connecting adjacent legs 25 and 26 at the opposite ends of the members 21 and 22. Screws 27, 27 hold the spacers 23 and 24 in position in the legs. A rod 28 extends transversely between the two spaced legs located at the righthand end of the support 20 and is adapted for rotation in these legs. Attached rigidly to the rod 28 is one end of a U-shape clamp 29 whose opposite end includes an interiorly threaded portion 30 accommodating an exteriorly threaded rod 34. A member 35 having a flat and smooth uppermost surface is mounted on the upper end of the threaded rod 34 while a hand grip 37 is affixed to the lowermost end thereof. The clamp 29 serves to removably attach the support 20 to a table top 38 or the like in the well known manner. Alternately, each of the legs of the support 20 may be adapted with one or more openings 39 to accommodate screws, not shown, whereby the support 20 may be removably attached to a table top or the like.

A groove 40 is formed in an inside surface of the horizontal portion of each U-shaped member 21 and 22, Figs. 1 and 3 so that the two grooves are disposed in opposed relation in a horizontal plane. A resilient or rubber bumper 41, 41 is positioned at the opposite ends of the grooves 40, 40 in both members 20 and 21 for the purpose that will appear later herein. Referring to Fig. 5, the bumper 41 comprises a body portion 42, a reduced neck 43 having one end formed integral therewith, and an enlarged wafer portion 44 formed integrally with the opposite end of the neck 43. The body portion 42 is positioned at each end of the grooves 40, 40 in such manner that the neck 43 is accommodated in a hole 45 provided at each of the opposite ends of the grooves 40, 40 and the wafer portion 44 firmly grips the outermost surface of the U-shape member 20 or 21.

Each bumper 41 is mounted in an end of each groove 40 by initially inserting the wafer portion 44 in the groove 40 against the hole 45, and then pushing the pumper 41 until the wafer portion 44 is forced completely through the hole 45 so that the bumper 41 is caused to occupy the position shown in Figs. 1 and 5, as described above. In this position the neck 43 is so accommodated in the hole 45 that the wafer portion 44 is caused firmly to grip the U-shape member 20 or 21 with considerable force whereby the disengagement of the bumper 41 from the latter members is precluded during action that will be described subsequently. The bumper 41 may be removed by forcing it in the direction opposite to that required for its insertion until the wafer portion 44 is entirely disengaged from the U-shape member 20 or 21. The foregoing insertion and removal of the bumpers 41, 41 may be expeditiously accomplished because of the resilient characteristic thereof.

Referring to Fig. 2 a cutting mechanism 50 comprises a pair of rectangular bars 51 and 52 held in spaced relation in a horizontal plane by inverted U-shape connectors 53, 54 and 55 spot welded thereto. A hand grip 56 connects the extreme righthand ends of the bars 51 and 52 for a purpose that will appear later herein. A plate 57 is spot welded to the uppermost surface of the members 53, 54 and 55. A pair of rollers 49, 49 of hard rubber or the like, each having an integral flange 49a, is rotatably mounted in spaced relation in a horizontal plane on the outside surface of each bar 51 and 52, and is accommodated in the grooves 40, 40 in Figs. 1 and 3 whereby slidable movements of the cutting mechanism 50 in righthand and lefthand directions in a horizontal plane are enabled. The resilient bumpers 41, 41 engage the rollers 49, 49 to limit these movements of the cutting mechanism 50.

A cutting element 58 in Fig. 2 comprises an elongated trough 59 whose opposite sides are formed with integral inverted L-shaped portions 60 and 61, each having a slot 62 provided in a horizontal surface of corresponding ends thereof for a purpose that will be pointed out subsequently. A knife 63 is spot welded to the uppermost surfaces of the L-shape portions 60 and 61 at a short distance from the vertical edges at one end thereof as shown at 63 in Figs. 2 and 4. This knife is formed with a cutting edge 64 on one end thereof, Figs. 2 and 4. Directly underneath the knife 63 in the trough 59 is an opening 65 whose function will be discussed hereinafter. Suitably affixed in a rigid manner in the trough 58 adjacent the opening 65 in proximity of a transverse edge thereof is a plurality of spaced knife blades 66, 66 arranged so that their cutting edges 67, 67 are disposed in the direction opposite to the opening 65. The number and spacing of knife blades 66 and the depth of the trough 59, i. e., the vertical lengths of the L-shape portions 60 and 61, depend on the type of cutting operation to be performed as will be subsequently explained. As shown in Figs. 3 and 4, the tops of the knife blades 66 lie slightly above the uppermost surface of the knife 63.

Referring to Figs. 2 and 4, it will be observed that the U-shape connectors 53, 54 and 55 are so positioned as to provide a space 68 between the uppermost edges of the bars 51 and 52 and the under surface of one end of the plate 57.

This space is adequate to permit the insertion and removal of corresponding ends of the L-shape portions 60 and 61 of the cutting element 58 so that contiguous transverse ends of the plate 57 and the knife 63 engage each other throughout their entire extents.

A locking device 70 mounted pivotally on corresponding ends of the spaced bars 51 and 52 as shown in Figs. 1, 2 and 3 comprises as illustrated in Fig. 6 a finger grip 71 spot welded to a U-shape strap 72 whose opposite leg portions 73, 73 are provided with dogs 74, 74. Directly below the dogs a pivot 75 is fixedly mounted on an inside surface of each vertical portion 73. These pivots are disposed off the center of the leg portions 73, 73 for a purpose that will later appear, and are mounted on the outside vertical surfaces of the spaced bars 51 and 52 so as to permit the locking device 70 to be rotated in a clockwise direction to occupy the unlocking position shown in dot-dash lines in Fig. 6, and from the latter position to be rotated in a counter-clockwise direction to occupy the locking position shown in full lines in Fig. 6. Obviously, the locking device 70 may be stamped out as a unitary structure with the pivots 74, 74 added thereafter.

The cutting element 58 is insertable into and removable from the cutting mechanism 50 in the following manner: Assuming the cutting element 58 removed from the cutting mechanism 50 and ready for insertion thereinto, the cutting mechanism 50 as the initial step for this purpose is pushed in a lefthand direction to occupy the broken line position shown in Fig. 2. The finger grip 71 is rotated in a clockwise direction to occupy its unlocking position as shown by the dot-dash position in Fig. 6, as above mentioned, and then the inverted L-shape portions 60 and 61, Fig. 2, are slid along the uppermost surfaces of the bars 51 and 52 until their extreme righthand portions are positioned snugly in the space 68 underneath a transverse edge of the plate 57 as illustrated in Figs. 2 and 4. With the cutting element 58 in such position, its openings 62 and 63, Fig. 2, will be positioned directly above the dogs 74, 74 on the locking device 70 so that as the cutting element 58 is lowered, the dogs 74, 74 will be accommodated in and pass through the openings 62 and 63. Thereafter, the finger grip 71 is rotated in a counter-clockwise direction to its locking position as shown in full lines in Fig. 6 as above mentioned. A leaf spring 76 or other suitable device mounted on each of the spaced bars 50 and 51 to engage the U-shape strap 72 of the locking device 70 serves to retain the latter in its locking position shown in Fig. 2.

The cutting element 58 may be removed from the cutting mechanism 50 by repeating the above operations in the reverse direction. Furthermore, it will be understood that the locking device 70 is mounted off-center with reference to its pivots 75, 75 as above pointed out with reference to Fig. 6 for the purpose of locking the cutting element 58 in the cutting position shown in Fig. 2. As a consequence, the actuation of the cutting mechanism 50 in the cutting strokes, i. e., in the lefthand direction as shown in Figs. 1 and 2, will tend further to lock the cutting element 58 in position in the cutting mechanism 50. The leaf springs 76 will tend to preclude the dislodgement of the cutting element 58 during the actuations of the cutting mechanism 50 in the non-cutting strokes, i. e., the righthand direction as shown in Figs. 1 and 2.

Referring to Fig. 1 a hopper 80 is mounted above the cutting mechanism 50 on the uppermost surfaces of the U-shape members 21 and 22 and suitably attached thereto preferably by screws 81, 81. This hopper includes a hollow interior provided with oppositely disposed and interiorly extending vertical slots 82, 82 in which may be removably positioned a separator 83 which serves to divide the hollow interior into two compartments for a purpose that will later appear. A cover 84 for the hopper 80 comprises a suitable handle 79 thereabove and a block 85, preferably of wood or the like, suitably affixed to the under surface of the cover and shaped to be accommodated in the interior of the hopper 80. This block includes a vertical slot 86 for removably receiving the separator 83. The length of the block 85 is so proportioned that its lowermost surface lies in proximity of but not in engagement with the knife blades 66 when the cover 84 is fitted tightly on the hopper 80. The purpose of the block 85 will appear later.

Referring to Figs. 1, 3 and 16, a food stop 87 is positioned on an outside face of the hopper 80 in proximity of the cutting element 58. A lower portion of the stop 87 includes a plurality of depending integral prongs 88 spaced so that each prong 88 is positioned between two adjacent knife blades 66, 66 in a transverse plane, i. e., one knife blade 66 between two adjacent prongs 88, 88 in the transverse plane and each prong 88 has a length so that its lowermost end is disposable to at least half the length of each knife blade 66, as shown in Fig. 3. An upper portion of the stop 87 includes a knurled finger nut 93 mounted on an outer end of a threaded rod 89 which extends through a slot 90 formed in a central portion of the stop 87 and which has its inner end rigidly mounted in a sidewall of the hopper 89 and peened as shown at 91a, Fig. 16. In an outside surface of the hopper 80 adjacent the stop 87 is a plurality of pairs of holes 91, 91 spaced from each other extending in a vertical direction. Each pair of holes 91, 91 effectively straddles the slot 90 and accommodates a pair of spaced pins 92, 92 provided on a surface of the stop 87 adjacent an end of the hopper 80. Thus, the stop 87 may be positioned at each of three different vertical levels along an outer face of the hopper 80 by positioning the pair of pins 92, 92 in one of the three pairs of vertically spaced holes 91, 91 by loosening the nut 93 and moving the stop 97 vertically via its slot 90 so that the lowermost end of each prong 88 reaches at least the midpoint of each knife blade 66. A tightening of the nut 93 when the stop 87 is disposed in one of its three positions tends to retain the latter therein for a purpose that will be pointed out subsequently herein. Obviously, the food stop 87 may be mounted interiorly of the hopper 80 or elsewhere on the cutting apparatus in Fig. 1 to achieve the purpose mentioned hereinafter.

It will be understood that the hollow interior of the hopper 80 is so proportioned that the righthand and lefthand movements of the cutting mechanism 50 are so limited, as hereinbefore mentioned, that the cutting knife 63 and knife blades 66 are contained at all times within the hopper 80. This precludes a user from contacting the cutting knife 63 and/or the cutting knife blades 66, 66 during the normal cutting operations of the overall cutting apparatus shown in Fig. 1 thereby obviating the possibility of harm to the user. This, at the same time, precludes foreign objects from gaining access to the cutting knife 63 and the cutting knife blades 66, 66 thereby obviating damage to these cutting members as well as contamination of the food.

The operation of the invention shown in Figs. 1, 2, 3, 4, 5, 6 and 16 is as follows:

Let it be initially assumed that the cutting apparatus shown in Fig. 1 is properly mounted on a table top or the like and that a potato, not shown, is to be cut into sections suitable for cooking in the so-called "French" style. For this operation the separator 83 is removed from the housing 80 in Fig. 1, and the potato preferably having the skin removed therefrom is inserted into the interior of the hopper 80 and the block 85 positioned on the top of the potato. Let it be further assumed that the cutting mechanism 50 is initially positioned in the extreme righthand position for the commencement of its cutting stroke. This tends to position the knife 63 and cutting knife blades 66, 66 substantially on a non-cut side of the potato in preparation for a cutting stroke to be mentioned presently. In the case of an extra large potato, the knife blades 66, 66 may tend to penetrate the lowermost portion thereof.

Then, the user places one hand on the hand grip 56 and the other hand on the handle 79, and then pushes the cutting mechanism 50 with the one hand in a lefthand direction or cutting stroke while the user's other hand presses on the handle 79 and thereby the block 85. As a consequence, the knife blades 66, 66 cut the lowermost portion of the potato in a plurality of parallel longitudinal slits in parallel vertical planes to a depth depending on the depth of the trough 59 and length of the knife blades 66, 66. As the potato is being so slitted the knife 63 follows the knife blades 66, 66 to cut the slitted portions in a horizontal plane just below the uppermost ends of the slits. This cuts off the slitted portion of the potato from the remainder of the potato in the hopper 80. This follows from the fact that the knife 63 is positioned slightly below the uppermost edges of the cutting blades 66, 66 as previously mentioned in connection with Fig. 4. The depth of the trough 59, the position of the knife 63 and the lengths of the cutting blades 66, 66 are so mutually proportioned as to cut the potato into sections of predetermined shapes and/or sizes. The cut-off sections of the potato pass through the transverse opening 65 and thereafter fall into a suitable receptacle, not shown, positioned below the hopper 80 for the purpose of receiving such cut-off portions.

On the next succeeding or non-cutting stroke the cutting mechanism 50, the user's hand pressure on the handle 79 is relaxed or removed entirely so that the cutting blades 66, 66 tend to slit none or at most to a depth which is less than the full length of the cutting blades 66, 66. The non-cutting and cutting strokes of the cutting mechanism 50 are thus repeated until the entire potato is cut into the desired strips.

After the final portion of the potato has been slit, it may have such height in a vertical direction as would tend to permit it to fit between the spaced cutting blades 66, 66 but below the undersurface of the cutting knife 63. As a consequence, the cutting mechanism 50 may be moved repeatedly in the cutting and non-cutting strokes carrying the final portion of the slit potato therewith but without dislodging it from its position between the cutting blades 66, 66 as just mentioned. This is precluded by use of the food stop 87 in the following manner. Depending on the depth of the trough 59, the stop 87 is positioned in one of the three vertical positions shown in Fig. 3 in the manner explained previously. For the purpose of this description at this point, it will be assumed that the trough 59 and stop 87 are positioned relative to each other as shown in full lines in Fig. 3. Now when the cutting mechanism 50 is pushed in a cutting stroke, the final portion of the slit potato engages the prongs 88, 88 and is stopped thereby. In response to further movement of the cutting mechanism 50 in the same cutting stroke, the final portion of the slit potato is forced through the opening 65 and into the receptacle therebelow. This tends to prevent waste of the smallest end portions of the potato. The foregoing cuts a whole potato into sections suitable for the so-called "French" style of cooking.

Fig. 10 shows a cutting element 95 adapted for cutting a potato into sections which are suitable for cooking in the so-called "Julienne" style. The cutting element 95 includes a trough 96 and a plurality of transversely spaced cutting blades 97, 97, but is otherwise identical with the cutting element 58, so dimensioned as to facilitate the cutting of the potato into the "Julienne" sections. For this purpose, it will be understood that the cutting element 95 is substituted for the cutting element 58 in Figs. 1 and 2.

Figs. 7, 8 and 9 show cutting elements 100, 101 and 102, respectively, which may be substituted for the cutting element 58 in Figs. 1 and 2 for the purpose of cutting elongated sections of fruit, vegetables or the like, such for example, as carrots and string beans into predetermined lengths. For this purpose the separator 83 is inserted into the vertical slots 82, 82 to form two compartments in the interior of the hopper 80, and thereafter the elongated vegetables are positioned vertically therein. The depths of the troughs 103, 104 and 105 of the cutting elements 100, 101 and 102, respectively, are so dimensioned with reference to the positions of the associated knives as to effect the cutting of the elongated vegetables into predetermined lengths such, for example, as dice, cubes, slices or the like. Obviously, the food stop 87 is adaptable for use with these cutting elements in such sense that one or more depending prongs 88 may be used therewith. In this event, each prong 88 will have a length that will permit its lowermost end to be disposable to at least half the distance between the upper surface of the trough and the under surface of the knife for each vertical position of the food stop 87 in Fig. 3.

Fig. 11 shows a cutting knife 106 formed with a wavy cutting edge 107 that may be substituted for the cutting knives included in the cutting elements 58, 95, 100, 101 and 102 described above. The wavy cutting edge 107 tends to provide the cut vegetable portions with wavy surfaces on the opposite sides thereof, particularly in the case of so-called "French" or "Julienne" types of potato sections.

Figs. 12, 13 and 14 show shredding elements 108, 109 and 110, respectively, each comprising a flat plate, a plurality of raised portions 112, 112 formed in spaced relation on one surface of the plate, each raised portion being integral with the plate except at one end at which an opening 111 is provided, and the openings 111, 111 extending through the raised portions and the plate. All raised portions 112, 112 are arranged to taper from their open ends toward their opposite ends, and are disposed in the same direction. These shredding elements are adapted for substitution in place of the cutting element 58 in Figs. 1 and 2. The only difference between the shredding element in Figs. 12, 13 and 14 lies in the sizes of openings 111, 111 and associated raised portions 112, 112, these openings and raised portions being so spaced and dimensioned in the respective cutting elements 108, 109 and 110 as to shred food into portions of predetermined sizes, as desired. In Figs. 12, 13 and 14, it will be understood that the shredded food portions are caused to drop through the openings 111, 111 during the cutting strokes of the cutting mechanism 50 in Figs. 1 and 2, into the receptacle positioned below the hopper 80 as mentioned above in connection with the operation of the cutting apparatus shown in Fig. 1.

Fig. 15 shows a grating element 113 comprising a flat plate, a plurality of groups of sharp edges 114, 114 formed integrally with one surface of the plate and spaced thereon, and the plate including a plurality of openings 115, 115 each of which is positioned substantially centrally of a group of sharp edges. All sharp edges 114, 114 are proportioned to extend substantially normally to the one surface of the plate approximately to the same extent. This element serves to grate cheese, bread, vegetables, fruits or the like for use in salads; and is adapted for substitution in place of the cutting element 58 in Figs. 1 and 2. Thus, the sharp edges 114, 114 and associated openings are proportioned to grate the food into portions of substantially predetermined sizes. In Fig. 15, the grated portions of the vegetables, fruits or the like fall through the openings 115, 115 during the cutting strokes of the cutting mechanism 50 in Figs. 1 and 2, into the receptacle positioned below the hopper 80 as previously explained concerning the operation of the cutting apparatus illustrated in Fig. 1.

The cutting knife 63 of Fig. 2 is omitted from the respective shredder and grater described above in connection with Figs. 12, 13, 14 and 15.

Fig. 17 shows a motor 120 connected by a suitable mechanical lever 121 to the handle 56 in Figs. 1 and 2 and by electrical leads 122, 122 to a source of electrical power, not shown, whereby the cutting mechanism 50 in Figs. 1 and 2 is adapted for operation by electrical power.

What is claimed is:

1. In food cutting apparatus, a pair of U-shape members spaced in an inverted manner from each other in a horizontal plane and secured to a table-like surface, a surface of each of said members including a horizontal groove, said grooves being coextensive in opposing relation in a horizontal plane, a resilient bumper disposed at the ends of each of said grooves, a cutting mechanism comprising a pair of spaced bars spaced in a horizontal plane, a plate so attached to said bars in proximity of corresponding ends thereof as to provide a predetermined space between the uppermost edges of said bars and the undersurface of said plate, a plurality of rollers mounted on each of said bars in a horizontal plane, said rollers being accommodated for slidable movement in said grooves whereby said mechanism is movable slidably on said members in a horizontal plane between said bumpers in cutting and non-cutting strokes, a cutting element including a trough having two opposite sides formed in integral inverted L-shape portions, a knife mounted on said L-shape portions adjacent corresponding ends thereof, said trough having an opening beneath said knife, a plurality of knife blades mounted in spaced relation in said trough adjacent a transverse edge of said opening, said knife blades having their cutting edges disposed in the direction opposite to said opening, corresponding surfaces of each of said L-shape portions having a slot, said element being positioned on said support so that said L-shape portions engage said bars and so that corresponding ends of said last-mentioned portions adjacent said knife are disposed in said predetermined space above said bars and beneath said plate, and a device for locking said cutting element on said support, said device comprising a U-shape strap, a finger grip on said strap, a dog formed on an end of each vertical leg of said strap, a pair of pivots for pivotally mounting said strap on said bars so that said dogs may be projected through and withdrawn from said slots under control of said finger grip, said pivots being mounted off the center of said vertical legs, and a hopper positioned above said mechanism on said members for containing the food being cut, said knife blades slitting the lowermost portion of the food in parallel vertical planes and said knife cutting substantially the sliced food portion in a horizontal plane just below the uppermost ends of the vertical slits thereby cutting off the slitted portion during the slidable movement of said support in the cutting stroke, the cut-off food portion falling through said opening and into a receptacle positioned below said hopper, said hopper having a hollow interior so proportioned as to enclose entirely said knife blades and said knife during the cutting and non-cutting strokes of said mechanism, said off-center pivots tending to cause said locking device to further lock said cutting element on said mechanism during the cutting strokes thereof.

2. Apparatus according to claim 1 including an adjustable food stop mounted on a wall of said hopper, said stop comprising a plurality of spaced depending prongs positioned adjustably in proximity of said trough, said prongs being so laterally spaced that each pair of adjacent prongs permits one of said knife blades to pass therebetween, said prongs pushing past said knife blades and into said opening such food that has a vertical dimension equal to or less than the distance from the bottom of said trough to said knife.

3. In food cutting apparatus, a support removably mountable on a table surface, a cutting mechanism slidable in opposite directions on said support, said mechanism comprising a pair of spaced elongated members slidable on said support, a horizontal knife disposed transversely on said members intermediate opposite ends thereof, said knife having a cutting edge positioned in a predetermined direction, a trough detchably mounted on corresponding ends of said members adjacent said cutting edge of said horizontal knife, said trough including a plane surface formed with spaced vertical portions which are provided with preselected lengths and which are detachably mountable on said members, said surface having an opening positioned substantially underneath said knife, a plurality of knife blades mounted vertically in preselected spaced relation on said surface in proximity of an edge of said opening, said last-mentioned edge being substantially parallel to said cutting edge of said horizontal knife and lying in said predetermined direction thereof, said knife blades having their cutting edges positioned in said predetermined direction of said cutting edge of said horizontal knife, said knife blades having such lengths that the uppermost ends of said cutting edges thereof lie above said horizontal knife, and a hopper disposed on said members and containing food to be cut, said hopper being proportioned to enclose said horizontal knife and vertical knife blades during the slidable movements of said mechanism, said cutting edges of said vertical knife blades slitting the lowermost portions of said food in said hopper and said cutting edge of said horizontal knife cutting off substantially the entire slitted food portions during the cutting movements of said mechanism, said cut-off food portions falling through said opening into a container positioned therebelow, said preselected lengths of said vertical portions of said trough and said preselected spacing between said vertical knife blades being so mutually proportioned as to provide said cut-off food portions with predetermined shapes.

4. In food cutting apparatus, a support removably mounted on a horizontal surface, and a cutting mechanism slidable in opposite directions on said support, said mechanism comprising a pair of elongated bars spaced in a plane parallel to said surface and slidable in said directions as a unit on said support, a horizontal cutting knife disposed transversely on uppermost edges of said bars intermediate opposite ends thereof and provided with a horizontal cutting edge positioned in a predetermined direction, a trough disposed adjacent said horizontal knife and comprising a plane surface formed on two opposite edges with integral inverted L-shaped portions detachably mountable on said uppermost edges of said bars and having vertical legs of a preselected length, said trough extending along said bars in a direction which is identical with said predetermined direction of said horizontal cutting edge, said plane surface having an opening below said horizontal knife, a plurality of knife blades disposed vertically in a preselected relation on said plane surface adjacent an edge of said opening lying in said predetermined direction of said horizontal cutting edge, said vertical knife blades having cutting edges disposed in a direction which is identical with said predetermined direction of said horizontal cutting edge, said vertical knife blades having such preselected lengths that the uppermost ends of said cutting edges thereof lie above said horizontal cutting edge, a hopper mounted on said support and containing the food to be cut, said hopper being proportioned to enclose said horizontal knife and vertical knife blades during the slidable movements of said mechanism, said cutting edges of said vertical knife blades slitting the lowermost portions of said food and said horizontal cutting edge cutting off substantially the entire slitted food portions during the cutting movements of said mechanism, said cut-off food portions falling through said opening into a container positioned therebelow, said preselected lengths of said vertical legs of said trough and said preselected spacing between said vertical knife blades being so mutually proportioned that said cut-off portions are provided with predetermined shapes, and a food stop mounted for vertical adjustments on a wall of said hopper farthest from said vertical knife blades, said stop comprising a plurality of spaced prongs whose lowermost ends are disposable in proximity of said trough surface, each two adjacent prongs permitting one of said vertical knife blades to pass therebetween, said prongs pushing past said vertical knife blades and into said trough opening such food portions that have vertical dimensions equal to or less than the distance from said trough surface to the undersurface of said horizontal knife.

ALBERT RODEL.
KARL E. SCHUKRAFT.

REFERENCES CITED

The following references are of record in the file of this patent:

UNITED STATES PATENTS

| Number | Name | Date |
|---|---|---|
| 28,419 | Trissler | May 22, 1860 |
| 168,033 | Lohr | Sept. 21, 1875 |
| 710,085 | Stevens | Sept. 30, 1902 |
| 895,161 | Childress | Aug. 4, 1908 |
| 1,265,833 | Tucker | May 14, 1918 |
| 1,834,717 | Knapp | Dec. 1, 1931 |
| 2,051,352 | Taylor | Aug. 18, 1936 |
| 2,103,537 | Killman | Apr. 28, 1937 |
| 2,237,955 | Arnt | Apr. 8, 1941 |

FOREIGN PATENTS

| Number | Country | Date |
|---|---|---|
| 387,402 | Great Britain | Feb. 9, 1933 |